United States Patent [19]

Marbach

[11] Patent Number: 5,779,223
[45] Date of Patent: Jul. 14, 1998

[54] VALVE WITH ROLLING CLOSURE MEMBER

[75] Inventor: Gérard Marbach, Cernay, France

[73] Assignee: Sevylor International, France

[21] Appl. No.: 692,967

[22] Filed: Aug. 7, 1996

Related U.S. Application Data

[63] Continuation of Ser. No. 403,452, Mar. 14, 1995, abandoned.

[30] Foreign Application Priority Data

Mar. 18, 1994 [FR] France ................. 94 03205

[51] Int. Cl.$^6$ ................................................. F16K 1/16
[52] U.S. Cl. .......................... 251/301; 251/88; 251/177
[58] Field of Search .................... 137/625.44, 625.45; 251/301, 88, 177, 298

[56] References Cited

U.S. PATENT DOCUMENTS

| | | | |
|---|---|---|---|
| 51,274 | 11/1865 | Woodman | 251/301 |
| 870,377 | 11/1907 | Marett | 251/301 X |
| 2,534,577 | 12/1950 | Courtot | 251/258 X |
| 3,191,277 | 6/1965 | Glasgow | . |
| 3,516,639 | 6/1970 | Himmelman | 251/257 |
| 3,538,953 | 11/1970 | Berger | 137/625.44 X |
| 4,078,764 | 3/1978 | Hoffner | 251/257 X |
| 4,718,453 | 1/1988 | Ahrens | 251/901 X |
| 5,441,080 | 8/1995 | Baumann | 251/258 X |

FOREIGN PATENT DOCUMENTS

| | | | |
|---|---|---|---|
| 0 385 812 | 9/1990 | European Pat. Off. | . |
| 624406 | 12/1935 | Germany | 137/625.45 |
| 1 650 538 | 4/1971 | Germany | . |
| 2 045 403 | 10/1980 | United Kingdom | . |

OTHER PUBLICATIONS

Patent Abstracts of Japan; vol. 7, No. 128 (M-220) (1273) 3 Jun. 1983 & JP-A-58 046 267 (Kunio Tatemori) *abstract.

*Primary Examiner*—John Fox
*Attorney, Agent, or Firm*—Larson & Taylor

[57] ABSTRACT

A valve for controlling the flow of a fluid, in particular a liquid, said valve comprising a closure member (1) of compact shape which is resiliently deformable, at least superficially, and which is suitable for closing or exposing a fluid flow orifice (2) which opens out at a surface (3) of the valve body (4), the surface (3) of the valve body (4) is generally plane and the closure member (1) is mounted to rotate freely about an axis (5), on support means (6) which are constructed so that, when the valve is closed, the closure member (1) approaches the orifice (2) with zero or a relatively small incidence with respect to the plane surface (3) so that, at least at the end of the approach, the closure member (1) rolls on the plane surface (3) and is resiliently compressed against that surface until it covers the orifice (2) which it then closes sealingly, the support means also being constructed so that, when the valve is open, the closure member (1) is held away from the orifice (2) and is not compressed against the surface (3).

5 Claims, 4 Drawing Sheets

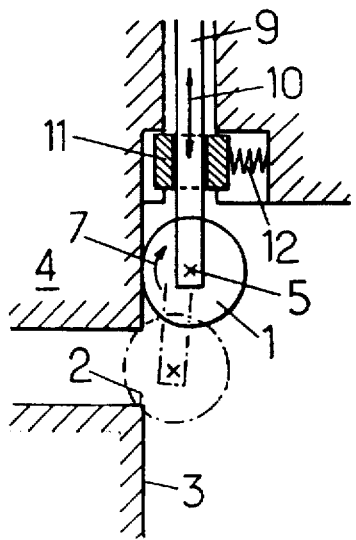
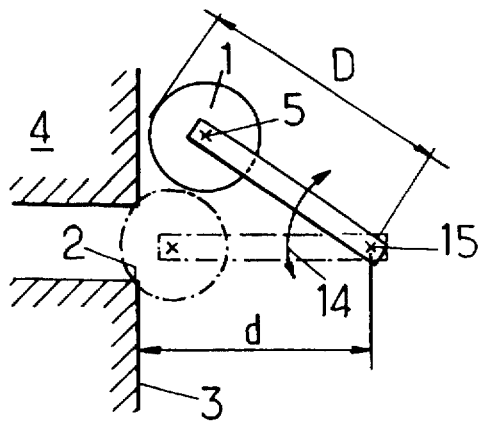
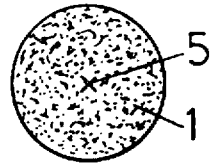
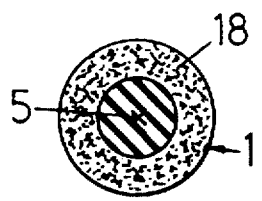
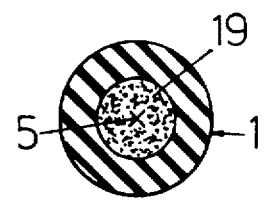
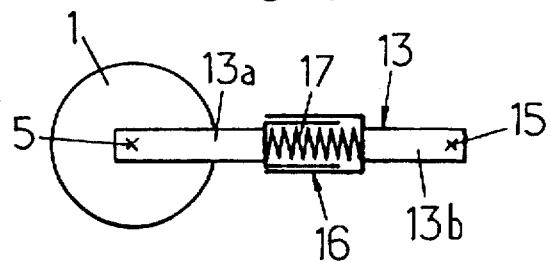

VALVE WITH ROLLING CLOSURE MEMBER

This application is a continuation of application Ser. No. 08/403,452 filed Mar.14, 1995 now abandoned.

FIELD OF THE INVENTION

The present invention relates to improvements in valves for controlling the flow of fluids, particularly liquids, such valves comprising a closure member of compact shape which is resiliently deformable, at least superficially, and which is suitable for closing or exposing a fluid flow orifice which opens out at a surface of the valve body.

BACKGROUND OF THE INVENTION

The valves which are currently used to control the flow of fluids, particularly liquids, are devices comprising matched components which therefore require machining. Valves with rotating closure members or throttle valves require accurate machining both of the closure member and of the seat in the valve body which receives the closure member. Valves with axiallymovable closure members or slide valves require at least the seats to be machined and also, in operation, there is the problem of the force required to move the closure member against the "stiction" of the seals as well as the problem of the force required to move the closure member in the fluid stream.

Generally, such valves are expensive and are therefore reserved for highly technical applications such as equipping networks for distributing drinking water and non-drinking water, etc. Because of their price, however, they are not suitable for so-called "consumer" applications for which more economical manufacturing methods are sought.

Moreover, conventional valves with matched components are sensitive to impurities, such as sand, soil, etc. which may be present in the liquid, and there is therefore a serious risk that the valve may bind, and even that the moving component may jam completely, which necessitates removal of the valve for cleaning or even replacement of certain components.

An essential object of the invention is to propose a new valve structure which, while giving efficient and reliable operation, is of very simple design, robust, easy to manufacture, and requires no maintenance even when controlling the flow of a liquid containing impurities; in particular, a construction is sought which requires no precise mechanical adjustment between the closure member and its seat and which consequently does not require any costly machining.

Consequently, a general object of the invention is also to propose an economical valve structure which can be used in widespread so-called "consumer" equipments such as for example the hydraulic equipment used to supply water to a domestic pool.

SUMMARY OF THE INVENTION

To these ends, a valve of the invention is characterized essentially in that the surface of the valve body is generally plane and in that the closure member is mounted to rotate freely about an axis, on support means which are constructed so that, when the valve is closed, the closure member approaches the orifice with zero or a relatively small incidence with respect to the plane surface so that, at least at the end of the approach, the closure member rolls on the plane surface and is resiliently compressed against that surface until it covers the orifice which it then closes sealingly, the support means also being constructed so that, when the valve is open, the closure member is held away from the orifice and is not compressed against the surface.

Thus, with such a construction, when the closure member is moved to cover the orifice, it is resiliently deformed, at least superficially, onto the orifice which it therefore covers sealingly.

A fundamental advantage of a valve constructed in accordance with the invention is that the closure member may be made, wholly or in part, of an inexpensive resilient material such as synthetic rubber, or a closed-cell foam, or a combination of such materials. Moreover, because of the absence of parts or portions which are of shapes that are accurately matched, particularly by machining, it is possible for most of the component parts to be made by moulding or by injecting synthetic materials. The entire valve (seat, closure member, moving closure member support, even the valve body) can therefore be made of synthetic material(s) at a cost which is particularly advantageous for devices for "consumer" applications intended to be manufactured in very large numbers.

In a first possible embodiment, the support means is constructed to be displaced approximately linearly, either substantially parallel to the surface or at a relatively small incidence with respect to the surface, so that the closure member rolls on said substantially plane surface when it reaches at least the vicinity of the orifice.

In a second possible embodiment, which is in practice preferred due to the opportunities it offers for controlling the movement of the closure member support means (rotational control by an electric motor and via a step-down gear if necessary), the support means are pivotally mounted, and the distance between the pivot axis and the region of the closure member which closes the orifice is resiliently reducible under the action of an axial force exerted on the closure member.

In which case, in order to enable the distance between the pivot axis and the region of the closure member which closes the orifice to be resiliently reducible, resiliently compressible means may be provided associated with the support means and operating along the direction passing through the axis of rotation of the closure member and the pivot axis of the support means, to allow elastic variation of the distance between the pivot axis of said support means and/or the axis of rotation of the closure member on said support means; as an alternative to the preceding construction or in combination with it, the closure member may be constituted, peripherally or entirely, of a resiliently compressible material, said material more particularly being a rubbery substance or a closed-cell foam.

The closure member will roll more readily on the surface including the orifice if the closure member has rotational symmetry about the axis of rotation of said closure member on the support means; optimum operation will be obtained if the closure member is chosen from a circular cylinder; a sphere; a segment of a sphere; a truncated cone; and a prism.

In an embodiment which is preferred due to the particularly good closure seal which can be obtained, the orifice is situated at the bottom of a trough which is hollowed in the substantially plane surface of the body and which has a transverse dimension substantially smaller than the diameter of the closure member and, in the closed position of the closure member, the material constituting the closure member is locally compressed and deformed so as to be pressed into said trough and to close the orifice in sealed manner.

A valve constructed in accordance with the invention may take any one of numerous embodiments suitable for satisfying very diverse technical requirements at very low cost.

BRIEF DESCRIPTION OF THE DRAWINGS

The invention will be better understood on reading the following detailed description of certain of its preferred embodiments which are given purely as nonlimiting examples. In this description, reference is made to the accompanying drawings in which:

FIGS. 2 and 3 are schematic section views of two advantageous embodiments of valves constructed in accordance with the invention;

FIGS. 4A, 4B and 4C are respectively schematic end views of three examples of the structure of a closure member for a valve of the invention;

FIG. 5 shows schematically an example of the structure of the closure member support means for a valve of the invention;

DESCRIPTION OF THE PREFERRED EMBODIMENTS

Figure 1A:
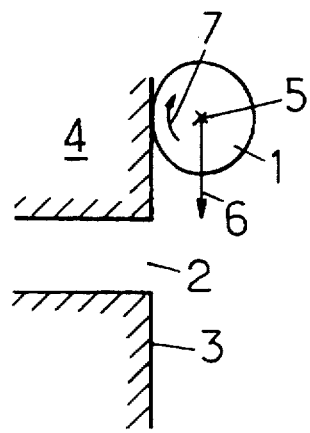
FIGS. 1AA, 1AB, 1B and 1C are very simple diagrams respectively showing three stages of operation of a valve constructed in accordance with the invention.
Figure 1A:
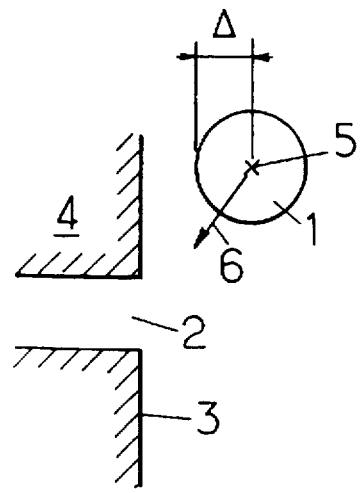
Figure 1B:
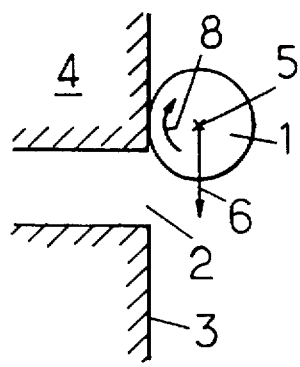
Figure 1C:
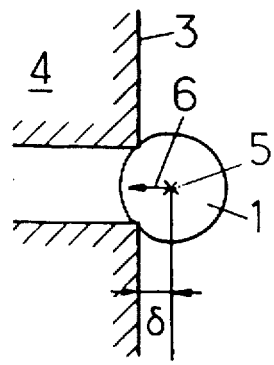

With reference to FIGS. 1A to 1C, an explanation is given firstly of the principle of the constitution and operation of a valve constructed in accordance with the invention, the valve being intended to control the flow of a fluid, in particular a liquid, and comprising a movable closure member 1 intended to close or to expose a fluid flow orifice 2 which opens out in a plane or substantially plane surface 3 of a body 4.

The closure member 1 is compact in shape, advantageously symmetrical, and preferably chosen from: a circular cylinder; a sphere; a segment of a sphere; and a truncated cone; a prismatic shape may also be considered, as explained later. The closure member is mounted so as to rotate freely about an axis 5 which coincides with its axis of symmetry, on support means 6 which are not shown in FIGS. 1A to 1C (examples are given later) the direction of action of the support means on the closure member 1 being indicated schematically by an arrow designated by the same reference numeral 6.

The closure member 1 is resiliently deformable, at least superficially, and actual examples of embodiments are given later.

Moreover, the dimension A of the closure member 1 in a direction transverse to its axis of rotation 5, measured from the axis 5 up to its peripheral region in the condition in which it is not resiliently deformed, is greater than the distance 6 of said axis 5 to the surface 3 containing the orifice 2 when the closure member 1 is in the position in which it closes the orifice 2.

Finally, the support means are constructed so that, when the valve is closing, the closure member 1 is brought towards the plane surface 3 containing the orifice 2 at zero incidence to said plane surface 3 (FIG. 1AA)—the closure member 1 then permanently bearing against and rolling on the plane surface 3 or at a relatively small incidence (FIG. 1AB) to said surface, such that, at least when the closure member 1 nears the orifice 2, the closure member 1 makes contact with and rolls on the surface 3 (arrow 8)—see FIG. 1B—until it completely covers the orifice 2 (FIG. 1C); in this last position, the closure member is pushed against the orifice 2 by the support means (arrow 6) and is resiliently deformed, at least superficially, onto the orifice 2 which it then closes sealingly.

FIG. 2 shows very schematically an example of an embodiment of the support means 6 for the case, illustrated in principle in FIG. 1AA, where the closure member 1 bears permanently against the surface 3 (zero incidence of approach). In this case, the closure member 1 is mounted to rotate freely at the end of an arm 9 which is supported so that it can be moved longitudinally (double arrow 10) under the action of drive means (not shown). Resilient force applying means—constituted for example by a guide sleeve 11 through which the arm 9 slidably passes without clearance and a spring 12 acting on the sleeve 11—push the arm 9 towards the surface 3 so that the closure member 1 bears permanently against and rolls on that surface when the arm 9 is moved. In the closed position, the spring 12 pushes the closure member 1 to bear in sealing manner against the orifice 2.

A mounting construction which is substantially similar to that of FIG. 2, but in which the arm 9 is slightly inclined with respect to the surface 3, allows operation with a linear approach towards the surface 3 at a relatively small incidence as illustrated in principle in FIG. 1AB.

However, another embodiment which also corresponds to operation with a relatively small incidence of approach towards the surface 3, such as illustrated in principle in FIG. 1AB, is preferably constituted as shown schematically in FIG. 3. The closure member 1 is mounted to rotate freely at one end of an arm 13 which is pivoted (double-headed arrow 14), at its other end, on an axis 15 situated approximately opposite the orifice 2. The distance D from the pivot axis 15 to the longitudinally opposed region or closure region of the closure member 1 is resiliently reducible under the action of an axial force exerted on the closure member 1. In other words, the total length D of the closure member 1 and its support arm 13 beyond its closure position is greater than the distance d of the pivot axis 15 from the surface 3.

To this end, it is possible to construct the arm 13 with resiliently compressible means 16, operating along the direction passing through the axis of rotation 5 of the closure member 3 and the pivot axis 15 of the arm 13, so as to allow the distance between these two axes to be resiliently varied. To this end, the axis of rotation 5 of the closure member and/or the pivot axis 15 of the arm may be flexibly mounted, with a return spring, on the arm 13; and/or the arm 13 may, as illustrated in FIG. 5, be constituted by two sections 13a and 13b, the common ends of which are nested together to slide freely, a compression spring 17 being interposed between them.

As an alternative to the preceding constructions, or in combination with them, the closure member 1 is constituted wholly or in part by a resiliently compressible material, such as a rubbery material or a closed-cell foam. This material may constitute the entire closure member 1 (FIG. 4A), a peripheral zone 18 of the closure member (FIG. 4B), a central zone (hub) 19 of the closure member (FIG. 4C) or an intermediate zone.

Figure 6:
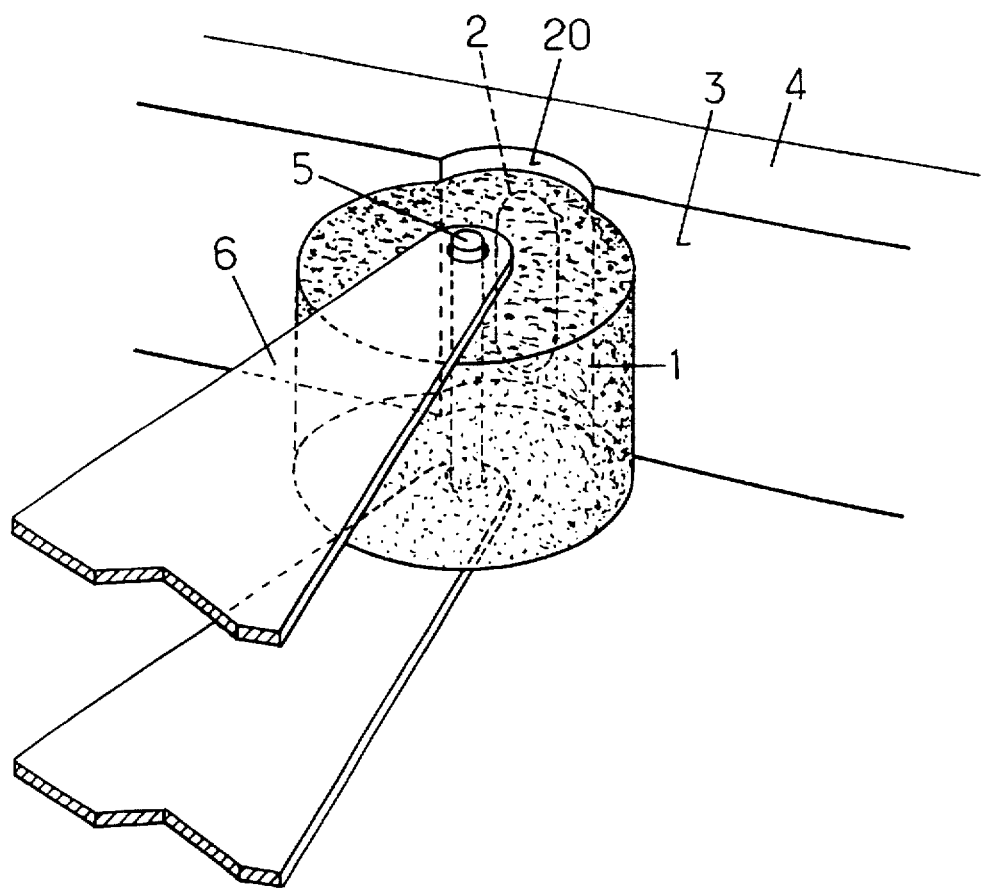
FIG. 6 shows a schematic perspective view of a preferred embodiment of a valve of the invention.

An advantageous embodiment of the rotating closure member of FIG. 3 is shown in FIG. 6. Here, the orifice 2 is situated at the bottom of a trough or dish 20 hollowed in the plane surface 3 of the body 4. In the example shown of a closure member which is a cylinder of revolution, the trough 20 is elongated in a direction parallel to the axis 5 of the closure member and the orifice 2 is itself of elongate shape in the same direction. The length of the trough 20 is substantially less than the diameter of the closure member. In the closed position shown, the material constituting the closure member (for example a closed cell foam) is locally compressed and deformed so as to be pressed into the trough 20 and assume the shape of its surface, thereby increasing the closure seal whilst stabilizing the closure member in its closed position.

Figure 7:
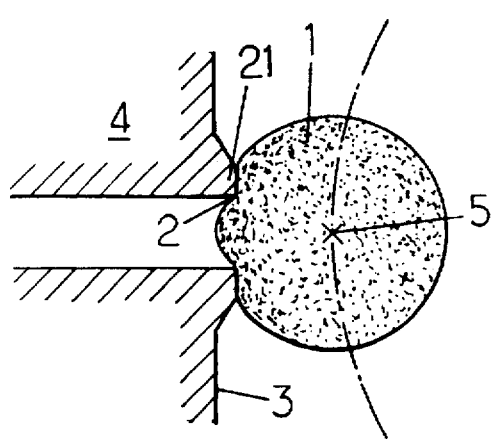
FIGS. 7 and 8 show schematic section views respectively of two other embodiments of the invention.

A good closure seal may also be obtained in a converse construction to the above, in which the orifice 2 opens into a protrusion 21 on the plane surface 3, as shown in FIG. 7, there being provided clamping means (not shown) associated with the support means for the axis of rotation 5 of the closure member 1 which allow said closure member 1 to be held in a stable manner against the protrusion 21 so as to sealingly close the orifice 2.

Figure 8:
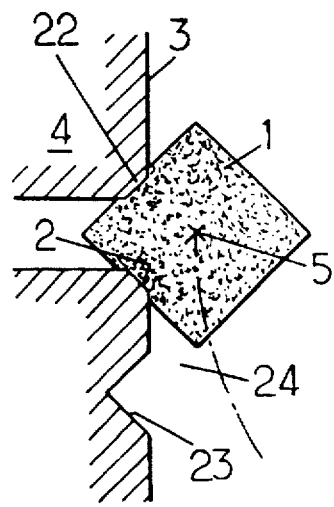
Figure 9:
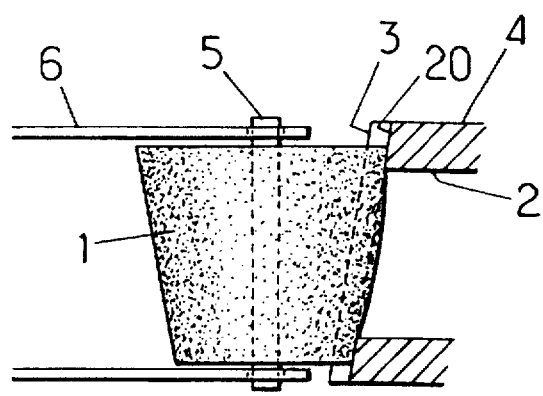
FIG. 9 shows a schematic section view of an embodiment of the invention in which the closure member is in the form of a truncated cone.

Finally, FIG. 8 illustrates an embodiment which uses a closure member in the shape of a prism of substantially square cross section, and FIG. 9 shows an embodiment of the invention in which the closure member 1 is in the shape of a truncated cone. Referring to the FIG. 8 embodiment, the orifice 2 opens out at the bottom of an elongate hollow 22 in the shape of a dihedron with substantially perpendicular walls (in other words, the walls of the orifice 2 are chamfered at 45°), so that, in the closed position illustrated in FIG. 8, the closure member 1 fits into the hollow 22 via two of its adjacent faces. Opening is obtained by causing the closure member 1 to roll (downwards in this case) on the plane surface 3 so as to release the closure member from the orifice 2. To facilitate this rolling, the surface 3 may advantageously be provided with a notch 23, situated below and parallel to the hollow, this notch being intended to receive that dihedral portion of the closure member 1, adjacent the closure dihedral portion, which bears against the plane surface 3 as it rolls (arrow 24).

In the different examples that have been disclosed above, the closure member 1 may advantageously be constituted, wholly, centrally or peripherally, by a relatively flexible (easily deformable) closed cell foam, with a Shore hardness of about 55 to 60. A closure member thus constituted is appropriate for controlling the flow of a liquid at a pressure of about $10^5$ Pascals, for example a pressure of up to 2 or 3 $\times 10^5$ Pa, which corresponds to the usual order of magnitude of the pumping pressure for recycling the water in an individual pool of the consumer type. Moreover, it will be noted that the closure members contemplated are functionally appropriate when the pressure of the liquid acts in a direction tending to apply the closure member against its seat (in a direction from right to left in the accompanying drawings), which has the advantage of improving the closure seal. In the case where the flow of liquid takes place in the opposite direction, the pressure acts in opposition to the mechanical closure force to which the closure member is subjected and, in conjunction with the flexibility of the foam as contemplated above, there is a risk that the closure sealing will no longer be ensured in such a reliable manner; the use of a less flexible foam, of higher Shore hardness, would therefore necessitate greater operational forces and would be less advantageous economically.

Moreover, the examples of closure member associated with pivoting support means, as more particularly envisaged above, which doubtless correspond to the most likely applications which can be envisaged for the invention, use support means acting in compression; however, other embodiments may be envisaged which use closure member support means acting in traction.

It goes without saying, as is already clear from the preceding description, that the invention is not limited solely to those applications and embodiments which are more particularly envisaged; on the contrary, the invention also embraces all variants.

I claim:

1. A valve for controlling the flow of a fluid comprising:

a valve body having a substantially planar surface;

a trough hollowed in said substantially planar surface;

a fluid flow orifice in said valve body, said fluid flow orifice opening in said trough of said substantially planar surface;

a closure member suitable for closing and exposing said orifice, said closure member being at least superficially made of a resilient material, said closure member having a diameter substantially greater than a transverse dimension of said trough;

support means arranged for supporting said closure member such that it is freely rotatable about an axis of rotation and arranged for pivoting about a pivot axis with respect to the valve body, said rotation axis and pivot axis being substantially parallel to each other and both being parallel to said substantially planar surface, said support means being arranged for holding said closure member in a position away from said orifice such that the closure member is not pressed against said substantially planar surface when the valve is open and arranged for pressing the closure member against the substantially planar surface such that said closure member is locally compressed and deformed so as to be pressed into said trough and to sealingly close the orifice when said valve is closed, said support means being movable for moving the closure member toward the orifice with a relatively small incidence with respect to the substantially planar surface such that the closure member rolls on the substantially planar surface near said orifice.

2. A valve according to claim 1, wherein a distance between the pivot axis and a region of the closure member which closes the orifice is reducible when an axial force is exerted on the closure member.

3. A valve according to claim 1 wherein the resiliently compressible material comprises at least one of a rubbery substance and a closed-cell foam.

4. A valve according to claim 1 wherein an outline of a right cross-section of the closure member is symmetrical about the axis of rotation of said closure member on the support means.

5. A valve according to claim 4, wherein a shape of the closure member is selected from the group consisting of: a circular cylinder, a sphere, a truncated cone and a prism.

* * * * *